United States Patent [19]
Iritani

[11] Patent Number: 5,036,931
[45] Date of Patent: Aug. 6, 1991

[54] COOLING SYSTEM FOR ENGINE MOUNTED ON VEHICLE

[75] Inventor: Hirofumi Iritani, Sakai, Japan

[73] Assignee: Kubota, Ltd., Osaka, Japan

[21] Appl. No.: 540,390

[22] Filed: Jun. 19, 1990

Related U.S. Application Data

[63] Continuation of Ser. No. 254,649, Oct. 7, 1988, abandoned.

[51] Int. Cl.⁵ .................................................. B60K 5/02
[52] U.S. Cl. ................................... 180/68.1; 180/68.4
[58] Field of Search .............................. 180/68.1, 68.4

[56] References Cited

U.S. PATENT DOCUMENTS

| | | | |
|---|---|---|---|
| 2,387,485 | 10/1945 | Young | 180/68.1 |
| 3,923,114 | 12/1975 | Suzuki | 180/68.1 |
| 4,081,050 | 3/1978 | Hennessey et al. | 180/68.1 |
| 4,590,891 | 5/1986 | Fujikawa et al. | 180/68.4 |
| 4,618,020 | 10/1986 | Noda et al. | 180/68.4 |
| 4,738,327 | 4/1988 | Takei | 180/68.4 |
| 4,771,844 | 9/1988 | Bassett | 180/68.1 |

FOREIGN PATENT DOCUMENTS 1269732 7/1961 France ........................... 180/68.1
59102429 12/1982 Japan .

*Primary Examiner*—David M. Mitchell
*Attorney, Agent, or Firm*—Edwin E. Greigg; Ronald E. Greigg

[57] ABSTRACT

A cooling system for an engine mounted in a front portion of a vehicle having a radiator disposed between the engine and a driver's seat, a fan mounted in proximity to the radiator for directing cooling air from the driver's seat to the engine through the radiator, and a cooling air flow passage for interconnecting the fan and ambient air. The cooling air flow passage is provided with an air inlet located away from the driver's seat and defined in the front portion of the vehicle at a forward position than a region of the radiator, extends from the air inlet and is defined by a partition plate and an engine hood.

10 Claims, 4 Drawing Sheets

COOLING SYSTEM FOR ENGINE MOUNTED ON VEHICLE

This is a continuation of copending application Ser. No. 07/254,649 filed on Oct. 7, 1988 now abandoned.

BACKGROUND OF THE INVENTION

1. Field of the Invention

The present invention relates to a vehicle comprising an engine mounted forwardly of a driver's seat, and an engine cooling fan and a radiator disposed between the driver's seat and the engine, wherein the cooling air produced by the fan is taken in from a rear region of the radiator and is directed toward the front of the vehicle.

2. Description of the Prior Art

Examples of this type of vehicle are known from U.S. Pat. Nos. 4,081,050 and 4,590,891 in which air inlets are provided adjacent a driver's seat, and the air inlets includes screens for preventing invasion of dust and supplementary heat exchange devices. In such a vehicle, sucking noise is generated when the air drawn by the fan passes through the screens and the heat exchange devices. Since the air inlets are provided adjacent the driver's seat, there has been a drawback that the sucking noise seriously deteriorates the driver's operational conditions.

SUMMARY OF THE INVENTION

An object of the present invention is to provide a vehicle which serves to solve the foregoing problem and reduce the sucking noise reaching the driver's seat as such as possible which is generated when the cooling air is drawn from the outside.

According to the present invention, the aforementioned object is achieved by an engine cooling system comprising a radiator disposed between the engine and the driver's seat, a fan disposed in the vicinity of the radiator such that cooling air introduced from the outside passes through the radiator and flows from the driver's seat toward the engine, and cooling air flow passage means for taking in ambient air, the passage means including air inlets defined in the front portion of the vehicle at forward positions that a region of the radiator, and a flow passage for interconnecting the air inlet and the fan.

In the above-constructed vehicle, the cooling air produced by the engine cooling fan is taken in from the air inlets defined in the hood at positions closer to the engine that the region of the radiator, and is sucked by the radiator by way of the cooling air flow passage means. The noise generated when ambient air is sucked is partly transmitted through the cooling air flow passage means and spreads outwardly of the vehicle in the course of transmission, which results in the reduced noise when the air is passing the cooling air flow passage means. Consequently, the sucking noise reaching the driver's seat is diminished.

Furthermore, when the air inlets are directed to the front of the vehicle as shown in one embodiment according to the present invention, the noise generated when ambient air is sucked spreads mainly toward the front of the vehicle, as a result of which the noise reaching the driver's seat is further reduced.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Embodiments according to the present invention will be described below referring to the accompanying drawings.

Figure 1:
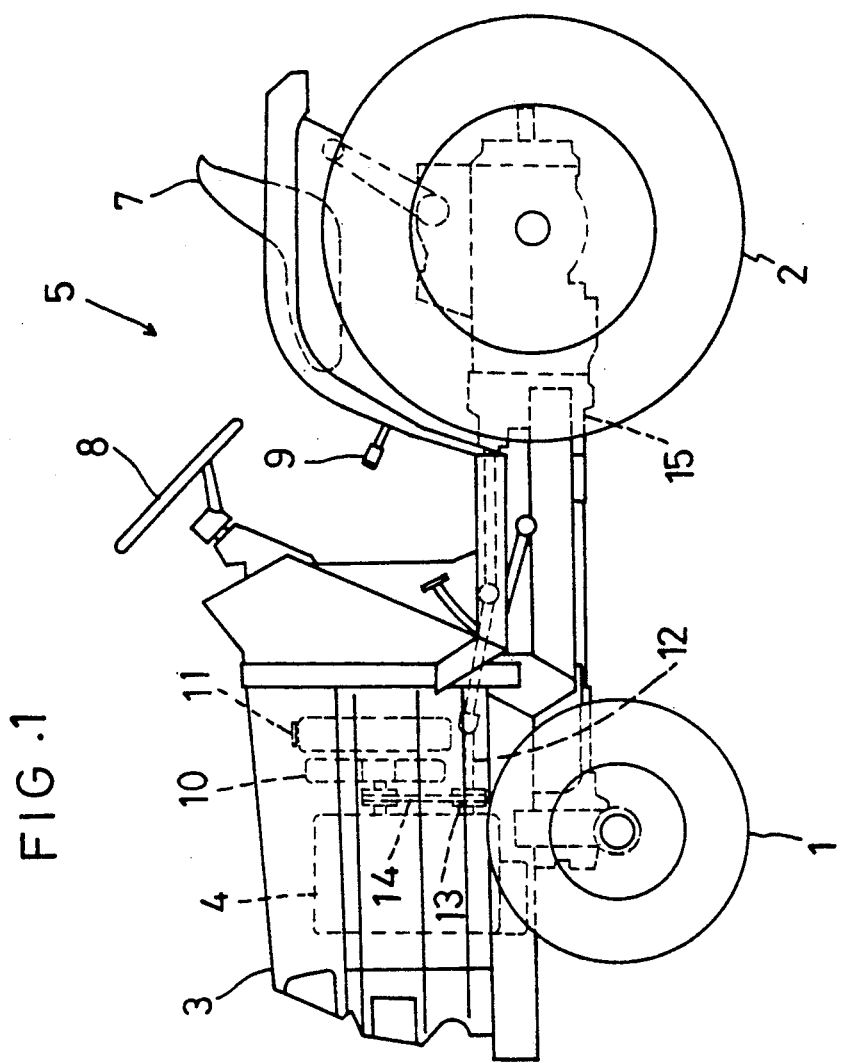
FIG. 1 is a side view of a tractor employing a cooling system according to the present invention.

FIG. 1 shows an agricultural tractor constructed as a riding type vehicle comprising pairs of right and left front wheels 1 and rear wheels 2 supported by a vehicle body in front and rear portions thereof, respectively, an engine 4 mounted inside a hood 3 disposed in a front portion of the vehicle body, and a driver's section 5 disposed in a rear portion of the vehicle body.

The driver's section 5 is provided with a driver's seat 7 for the operator, a steering wheel 8 for steering the front wheels 1, a change speed lever 9 and the like. The engine 4 and driver's seat 7 interpose an engine cooling fan 10 and a radiator 11 therebetween.

Drive from an output shaft 12 disposed rearwardly of the engine 4 is transmitted through pulleys 13 and a belt 14. The fan 10 is rotatably driven in response to rotations of the engine 4. Engine cooling air produced by the fan 10 flows from rearwardly of the vehicle to forwardly of the vehicle, i.e., from the driver's seat 7 toward the engine 4.

Rotational output of the engine 4 is transmitted to the rear wheels 2 through the output shaft 12 and a transmission 15 thereby driving the vehicle.

Above the engine 4 is disposed a muffler 21 for reducing the exhausting noise of the engine exhausts.

Figure 2:
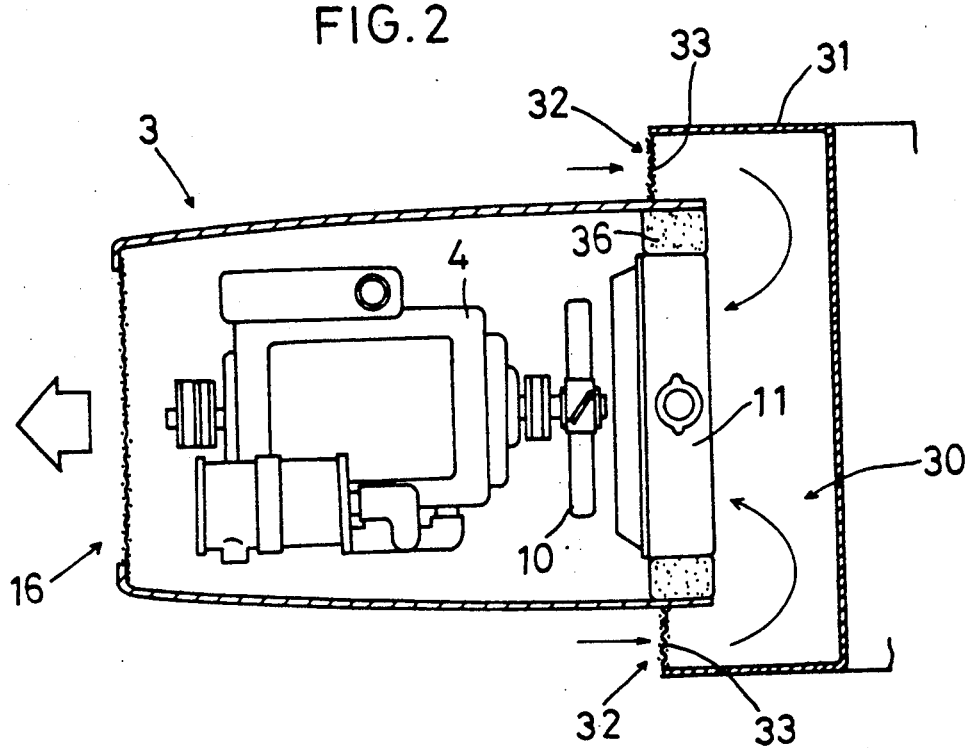
FIG. 2 is a section view of a prime embodiment of the cooling system according to the present invention.

As apparent from FIG. 2, cooling air flow passage means 30 is disposed rearwardly of the radiator 11, which passage means has a boundary defined by a frame 31.

As shown in FIG. 2, air inlets 32 for taking ambient air into the foregoing cooling air flow passage means are disposed in lateral side regions of the vehicle body, which air inlets having openings directed to the front of the tractor. More particularly, each of the air inlets 32 is defined by a rear end of an engine hood 3 and the frame 31 extending laterally and outwardly of the hood 3. That is, the inlets 32 is positioned away from the driver's seat 7 compared with the conventional structure. The air inlets 32 include dust-free nets 33 through the whole range of the openings, respectively, for preventing dust from entering the interior of the vehicle. The engine hood 3 defines an air outlet 16 in a front end thereof for exhausting the engine cooling air having cooled the engine 4.

Numeral 36 denotes sealing members having the noise-absorbing effect. These members serve to prevent the transmitting noise of solid matter from being transmitted.

Figure 3:
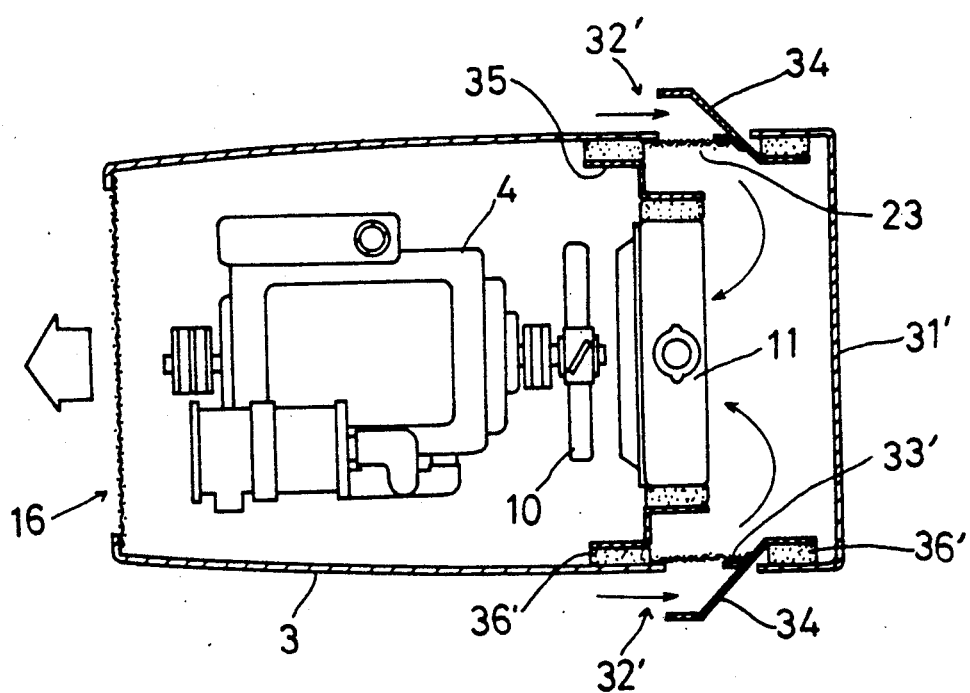
FIG. 3 is a section view showing a modification of the prime embodiment.

FIG. 3 shows a modified example of the embodiment described above. With this modification, in place of the air inlets defined by the hood and the frame as shown in the previously described embodiment, air inlets 32' are formed as openings directed to the front of the vehicle, which inlets are defined by lateral side walls of the hood and projections 34 as seen from the drawing. Further, the radiator 11 and hood 3 interpose intermediate members 35 therebetween which sealingly engage the radiator 11 and the hood through the noise-absorbing sealing members 36', respectively. In like manner, the frame 31' and the projections 34 interpose the noise-absorbing sealing members 36' therebetween.

Figure 4:
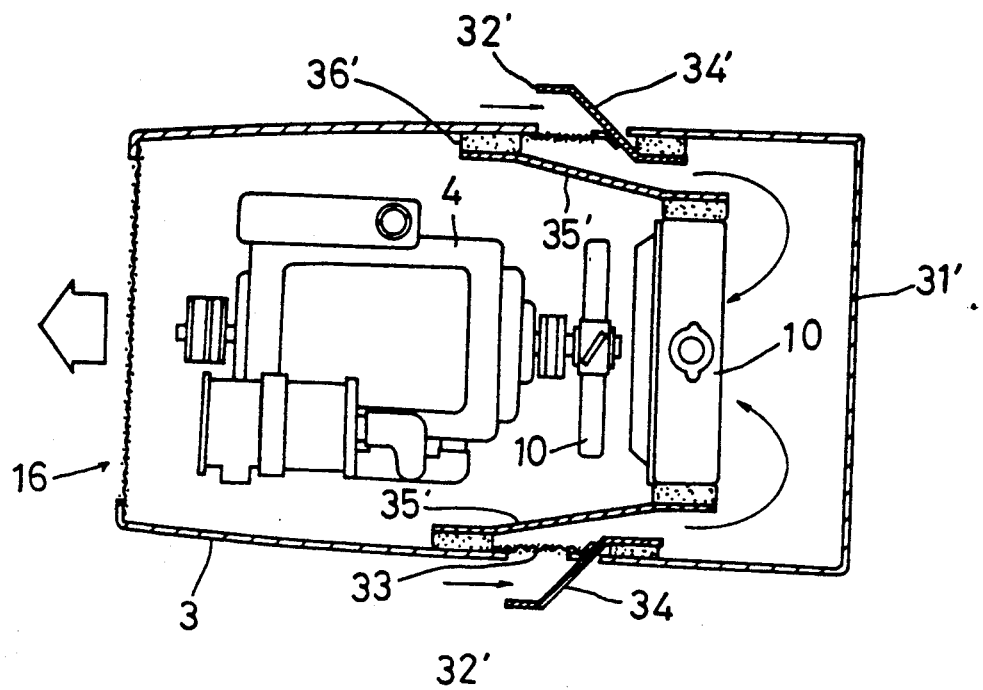
FIG. 4 is a section view showing another modification of the prime embodiment.

FIG. 4 shows another modification similar to the cooling system illustrated in FIG. 3, in which the air inlets 32' are defined at positions of the hood 3 corresponding to rear end portions of the engine 4. Owing to this structure, intermediate members 35' and projections 34' cooperate with each other so as to form cooling air ducts. The like numbers shown as in FIG. 3 identify the elements having the like functions, and the detailed descriptions of these elements are omitted in order to avoid meaningless repetition.

According to the each cooling system, though the air inlets 32 and 32' are provided in the lateral portions of the vehicle body, they may be defined in either or both of an upper and a lower portions of the vehicle.

A second embodiment according to the present invention will be described below.

Figure 5:
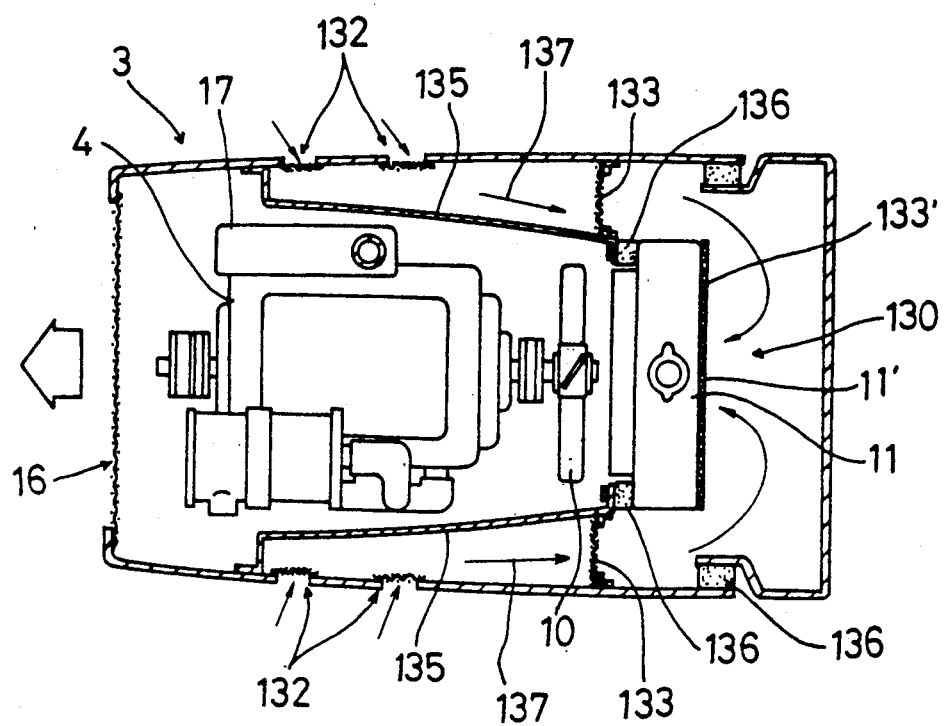
FIG. 5 is a side view of a second embodiment of the cooling system according to the present invention.

As seen from FIG. 5, in opposite lateral side portions of the hood 3 closer to the engine 4 than the radiator 11 are defined engine cooling air inlets 132, and inside the hood 3 are provided partition plates 135 forming cooling air intake passages 137 extending from the air inlets 132 to an air intake portion 11'.

More particularly, each of the partition plates 135 is secured to an inner wall of the hood 3 at a side end thereof in a position forwardly of each air inlet 132, and to an edge of the radiator at the other end thereof through a noise-absorbing sealing member 136. As a result, in normal operations, that is, in a condition in which the hood 3 is closed, the cooling air intake passages 137 are defined by the partition plates 135 and the hood 3. In other words, the cooling air flow passage means 130 is formed so as to surround the engine and the radiator.

The hood 3 includes an air outlet 16 defined in a front end thereof for exhausting the cooling air having cooled the engine 4. In the course of the air flow passages, large dust-free mesh members 133 are provided, respectively, for supporting the partition plates 135 and preventing relatively large particles from entering the raditor 11. The air intake portion 11' of the radiator 11 is provided with a finer dust-free mesh member 133' for preventing invasion of fine and small particles.

With the agricultural tractor as constructed above, sucking noise generated when ambient air is taken in is mainly produced by the dust-free mesh members 133' in proximity to the radiator 11, and is transmitted outwardly of the vehicle through the cooling air intake passages 137 and the air inlets 132. The noise volume is reduced as the air passes through the air intake passages 137. In addition, the position of the air inlets 132 away from the driver's seat 7 allows the sucking noise reaching the driver's seat 7 as described above to be extremely lessened.

Furthermore, due to the provision of the partition plate 135, the heat of the engine 4 or a muffler 17 is not directly transmitted to the hood 3, which results in the increased mechanical strength of the hood 3 as well.

Wind guide plates may be provided in the vicinity of the air inlets 132.

Figure 6:
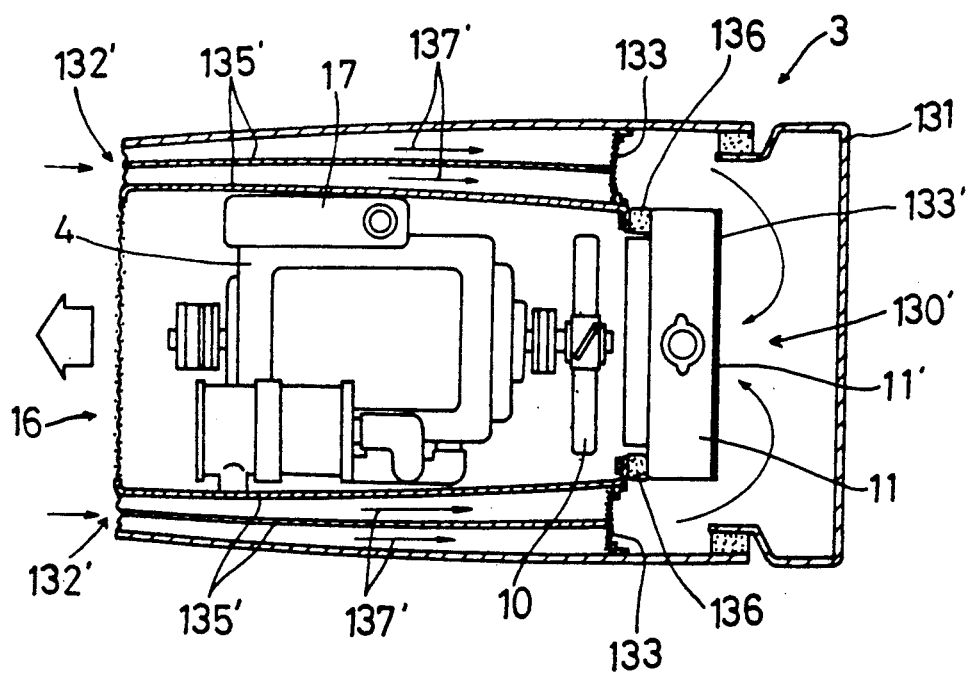
FIG. 6 is a section view showing a modification of the second embodiment.

In a modified example of the second embodiment as shown in FIG. 6, cooling air flow passage means 130' includes air inlets 132' defined in front portions of the hood 3, two partition plates 135' and two lanes of air intake passages 137'. The like numerals as shown in FIG. 4 identify the like functions, and therefore are not repeatedly explained.

What is claimed is:

1. A cooling system for an engine mounted in a front portion of a vehicle, said engine being positioned forwardly of a driver's seat and covered by a hood, said cooling system comprising;
    a radiator disposed between said engine and said driver's seat,
    a fan mounted in proximity to said radiator between said radiator and said engine for drawing cooling air from an area along said hood forward for the driver's seat to said engine through said radiator, and
    cooling air flow passage means for taking in cooling air, said air flow passage means including an air inlet defined in the front portion of the vehicle at positions forward of a region of said radiator, said air inlet intercommunicating with said fan, a first noise absorption means between said radiator and an intermediate member, and a second noise absorption means between said intermediate member and said hood which prevents air from being drawn around said radiator.

2. A cooling system as claimed in claim 1 wherein said cooling air flow passage means extends from said air inlet and is provided with a passage defined by a partition plate and said hood.

3. A cooling system as claimed in claim 1 wherein said air inlet is facing the front of the vehicle.

4. A cooling system as claimed in claim 3 wherein said air inlet is positioned substantially at a position opposite a region of said engine juxtaposed said fan.

5. A cooling system as claimed in claim 1 wherein said air inlet is defined in a lateral side face of said hood.

6. A cooling system as claimed in claim 2 wherein said air inlet is defined in a front face of said hood.

7. A cooling system as claimed in claim 5 wherein said cooling air flow passage means is defined by a partition plate interconnecting said air inlet, said radiator, and said hood.

8. A cooling system as set forth in claim 1 which includes
    noise absorption means between a portion of said air inlet and said hood.

9. A cooling system as set forth in claim 1 which includes air filter means in said inlet which filters incoming air.

10. A cooling system as set forth in claim 8 which includes air filter means in said inlet which filters incoming air.

* * * * *